(12) United States Patent
Bouzguarrou et al.

(10) Patent No.: US 10,691,461 B2
(45) Date of Patent: Jun. 23, 2020

(54) DATA PROCESSING

(71) Applicant: Arm Limited, Cambridge (GB)

(72) Inventors: Houdhaifa Bouzguarrou, Valbonne (FR); Guillaume Bolbenes, Antibes (FR); Vincenzo Consales, Paca (FR); Eddy Lapeyre, Antibes (FR)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/852,065

(22) Filed: Dec. 22, 2017

(65) Prior Publication Data

US 2019/0196833 A1 Jun. 27, 2019

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3842* (2013.01)

(58) Field of Classification Search
CPC .............................. G06F 9/3842; G06F 9/3806
See application file for complete search history.

(56) References Cited

U.S. PATENT DOCUMENTS

2002/0174322 A1* 11/2002 Kruckemyer ......... G06F 9/3842
712/218

OTHER PUBLICATIONS

[Online], Wikipedia—Branch Predictor—https://en.wikipedia.org/wiki/Branch_predictor, Dec. 13, 2017, 9 pages.
U.S. Appl. No. 15/806,605, Guillaume Bolbenes et al., filed Nov. 8, 2017, 27 pages.

* cited by examiner

*Primary Examiner* — Zachary K Huson
(74) *Attorney, Agent, or Firm* — Nixon & Vanderhye, P.C.

(57) ABSTRACT

Data processing circuitry comprises fetch circuitry to fetch blocks, containing instructions for execution, defined by a fetch queue; and prediction circuitry to predict one or more next blocks to be fetched and to add the predicted next blocks to the fetch queue; the prediction circuitry comprising: branch prediction circuitry to detect a predicted branch destination for a branch instruction in a current block, the predicted branch destination representing either a branch target for a branch predicted to be taken or a next instruction after the branch instruction, for a branch predicted not to be taken; and sequence prediction circuitry to detect sequence data, associated with the predicted branch destination, identifying a next block following the predicted branch destination in the program flow order having a next instance of a branch instruction, to add to the fetch queue the identified next block and any intervening blocks between the current block and the identified next block, and to initiate branch prediction in respect of the predicted next instance of a branch instruction.

18 Claims, 6 Drawing Sheets

DATA PROCESSING

BACKGROUND

This disclosure relates to data processing.

In some data processing applications, so-called branch prediction is used to predict instances of non-linear program flow, such as the outcome (branch taken or branch not taken) from conditional program flow branching instructions.

In some examples, the branch prediction process runs ahead of the execution of the instructions to provide the instructions speculatively in time to avoid so-called starvation (which would occur if insufficient instructions (that were next to be executed) were fetched in time for execution.

In order to predict the presence of a branch into a given program code portion, a historical data store such as a so-called branch target buffer (BTB) can provide an indication of previously taken branches at particular program counter (PC) values. Again, in some examples, branch prediction can be provided by a so-called BPB (Branch Prediction Buffer) which stores historical direction data (branch taken or not taken) to steer a prediction.

SUMMARY

In an example arrangement there is provided data processing circuitry comprising:

fetch circuitry to fetch blocks, containing instructions for execution, defined by a fetch queue; and prediction circuitry to predict one or more next blocks to be fetched and to add the predicted next blocks to the fetch queue;

the prediction circuitry comprising:

branch prediction circuitry to detect a predicted branch destination for a branch instruction in a current block, the predicted branch destination representing either a branch target for a branch predicted to be taken or a next instruction after the branch instruction, for a branch predicted not to be taken; and sequence prediction circuitry to detect sequence data, associated with the predicted branch destination, identifying a next block following the predicted branch destination in the program flow order having a next instance of a branch instruction, to add to the fetch queue the identified next block and any intervening blocks between the current block and the identified next block, and to initiate branch prediction in respect of the predicted next instance of a branch instruction.

In another example arrangement there is provided data processing apparatus comprising:

means for fetching blocks, containing instructions for execution, defined by a fetch queue; and means for predicting one or more next blocks to be fetched; and means for adding the one or more predicted next blocks to the fetch queue;

the means for predicting comprising:

means for detecting a predicted branch destination for a branch instruction in a current block, the predicted branch destination representing either a branch target for a branch predicted to be taken or a next instruction after the branch instruction, for a branch predicted not to be taken;

means for detecting sequence data, associated with the predicted branch destination, identifying a next block following the predicted branch destination in the program flow order having a next instance of a branch instruction, so that the predicted one or more next blocks comprise the identified next block and any intervening blocks between the current block and the identified next block;

means for adding to the fetch queue the identified next block and any intervening blocks between the current block and the identified next block, and means for initiating branch prediction in respect of the predicted next instance of a branch instruction.

In another example arrangement there is provided a data processing method comprising:

fetching blocks, containing instructions for execution, defined by a fetch queue; and predicting one or more next blocks to be fetched; and adding the predicted one or more next blocks to the fetch queue;

the predicting step comprising:

detecting a predicted branch destination for a branch instruction in a current block, the predicted branch destination representing either a branch target for a branch predicted to be taken or a next instruction after the branch instruction, for a branch predicted not to be taken;

detecting sequence data, associated with the predicted branch destination, identifying a next block following the predicted branch destination in the program flow order having a next instance of a branch instruction, so that the predicted one or more next blocks comprise the identified next block and any intervening blocks between the current block and the identified next block, and initiating branch prediction in respect of the predicted next instance of a branch instruction.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
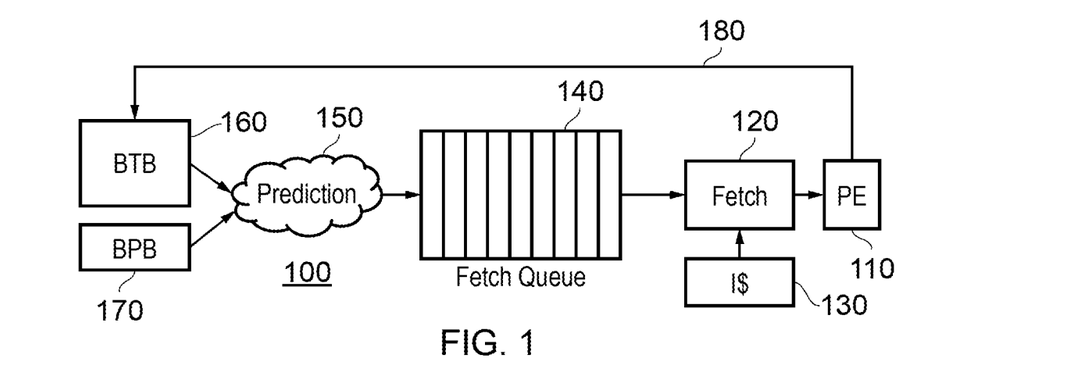
FIG. 1 schematically illustrates an example of data processing circuitry.

FIG. 1 is a schematic example of data processing circuitry 100 comprising a processing element (PE) 110 to execute program code instructions, fetch circuitry 120 to fetch blocks, containing instruction for execution, from memory and/or an instruction cache ("I$") 130. The blocks to be fetched are defined by a fetch queue 140. The data processing circuitry also comprises prediction circuitry 150 to predict one or more next blocks to be fetched and to add the predicted next blocks to the fetch queue 140.

The prediction circuitry 150 makes reference to branch target storage including at least a branch target buffer (BTB) 160 and to a branch prediction buffer (BPB) 170. These are drawn separately for clarity of the diagram but may be considered part of the prediction circuitry 150. The BTB 160 provides information which associates program counter (PC) values of an instruction to be executed with an associated branch target in the case that the instruction is a branch instruction. The BPB 170 stores historical data about the outcome (branch taken or branch not taken) of previous instances of the branch instructions, the historical data allowing the prediction circuitry 150 to arrive at a prediction of whether a particular branch instruction indicated by the BTB 160 will be taken or not taken.

Various mechanisms may be used by the prediction circuitry 150 to predict the "taken" or "not taken" status for an expected branch instruction. An example of such a technique is provided in U.S. Ser. No. 15/806,605 and https://en.wikipedia.org/wiki/Branch_predictor, the contents of each of which are hereby incorporated by reference. The prediction circuitry 150 uses such a technique to predict blocks (or portions, or granules) of program code to be fetched and adds data identifying such blocks to the fetch queue 140, on a first-in, first-out basis. The fetch circuitry 120 retrieves such data from the fetch queue 140 on the same basis (which is to say, the fetch circuitry 120 retrieves the least-recently-added entry or entries in the fetch queue 140) and initiates fetching of the blocks indicated by those entries. the required blocks may be in the instruction cache 130 or may need to be retrieved from a main memory or higher level cache (not shown).

In due course, the processing element 110 executes the fetched blocks of program code. Generally speaking, the system aims to fetch program code in advance of its execution, so that processing is not itself held up by a lack of code to be executed. So in this regard the fetching is speculative and is based purely on predictions made by the prediction circuitry. The predictions of branch outcomes will be proved to be either correct or incorrect when the relevant branch instruction is finally executed or resolved. If a prediction is incorrect, it may be that the wrong branch target code has been fetched and the fetch and execution pipelines have to be flushed, incurring a delay while the correct blocks of program code are fetched for execution.

The processing element can provide information 180 back to the BTB 160 and BPB 170 relating to branch instructions actually encountered during execution, as well as their actual outcome. Where a branch instruction is encountered during execution (at least for a branch instruction where the branch is actually taken, though possibly for all branch instructions), information can be stored in the BTB 160 relating to that branch instruction. Information relating to the outcome of the branch instruction can also be stored in the BPB 170.

Figure 2:
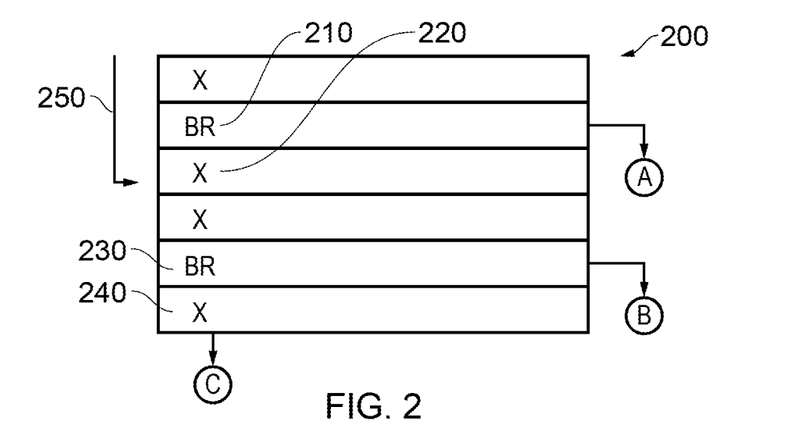
FIG. 2 schematically illustrates a series of data processing instructions.

FIG. 2 schematically illustrates a series of data processing instructions forming an example of a program code block, portion or granule 200. In the schematic representation of FIG. 2, six instructions are illustrated, but in example embodiments of the present disclosure the blocks of instructions may have a consistent base length (in bytes), being for example a power of two or at least a multiple of two, and are address-aligned in memory to positions representing multiples of the base length. For example, each portion may have a base length of 16 bytes and the portions may be aligned to 16 byte boundaries in memory.

In FIG. 2, the successive instructions are indicated as either "X" or "BR". The "X" instructions are non-branching instructions and are represented in this schematic manner to indicate that it is irrelevant to the present discussion what type of instruction they are. The "BR" instructions are conditionally branching instructions which can lead to a non-linear change in program flow depending on one or more parameters on the basis of which branch decision is taken.

Referring to a first example branch instruction 210, if the branch represented by this instruction is taken, then program flow is diverted to another program counter value A. If not, program flow continues to the next sequential instruction 220. Similarly, if the branch at a branch instruction 230 is taken, program flow is diverted to a program counter value B, but if not, flow continues to the next sequential instruction 240. Therefore, as a result of execution of the portion 200, program flow can:

redirect to the program counter value A;
redirect to the program counter value B; or
continue to the next-in-order program counter value C.

Note that branch targets or destinations do not have to be aligned with the beginning of a portion such as the portion 200. In fact, a branch from elsewhere may enter the portion 200 at any instruction position, for example at the instruction 220 for an incoming branch 250.

Figure 3:
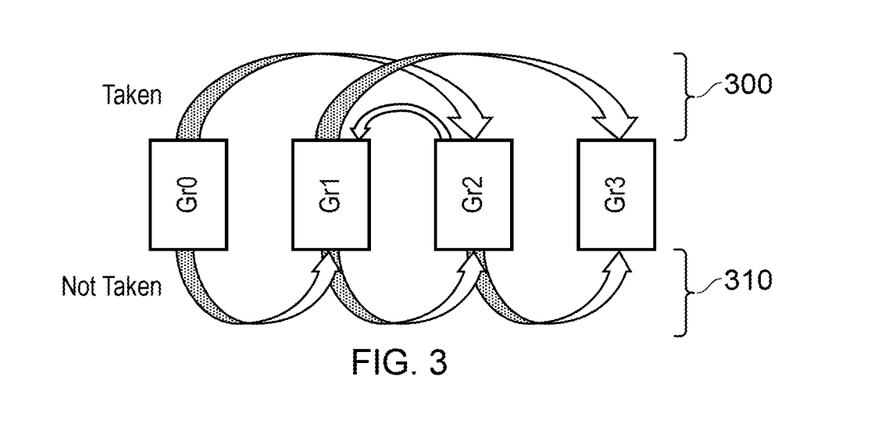
FIG. 3 schematically illustrates successive program code portions or granules.

FIG. 3 schematically illustrates an example of successive program code blocks, portions or granules (Gr) Gr0, Gr1, Gr2, Gr3. Each of the granules Gr0 . . . Gr2 contains a branch instruction in this schematic example.

An upper portion 300 of FIG. 3 illustrates an example situation when the branches are taken so that program flow is diverted from Gr0 to Gr2, then to Gr1, then to Gr3 in a non-linear fashion. If the branches are not taken, program flow continues sequentially from Gr0 to Gr1 to Gr2 to Gr3 as shown by a lower portion 310 of the diagram.

In the example of FIG. 3, as each of the granules is fetched or at least predicted for fetching, a further prediction is made as to the next granule to require fetching. In many instances, as mentioned above, the fetching process operates in advance of instruction execution so as to attempt to insure that sufficient instructions are fetched and ready for execution at the appropriate time. This implies that predictions by the prediction circuitry 150 need to be used rather than relying on the real outcomes of the execution of branch instructions to indicate a next granule for fetching. As mentioned above, in FIG. 1, feedback can be provided by data communication 180 from the processing element to, for example, the BPB 170 to indicate the actual outcomes or targets of actually executed branch instructions.

Returning to FIG. 3, at each granule, a lookup is made to the BTB and BPB of FIG. 1 to generate a predicted next granule. However, the present disclosure recognises that at least some of these lookups may be unnecessary. For example, if a granule or portion of code newly predicted to be fetched does not in fact contain any branch instructions, there is no need to undertake power-hungry lookups of the BTB and BPB to detect what the next granule will be; it will simply be the next-following granule in program code order. Techniques will be described below to make use of this observation.

Figure 4:
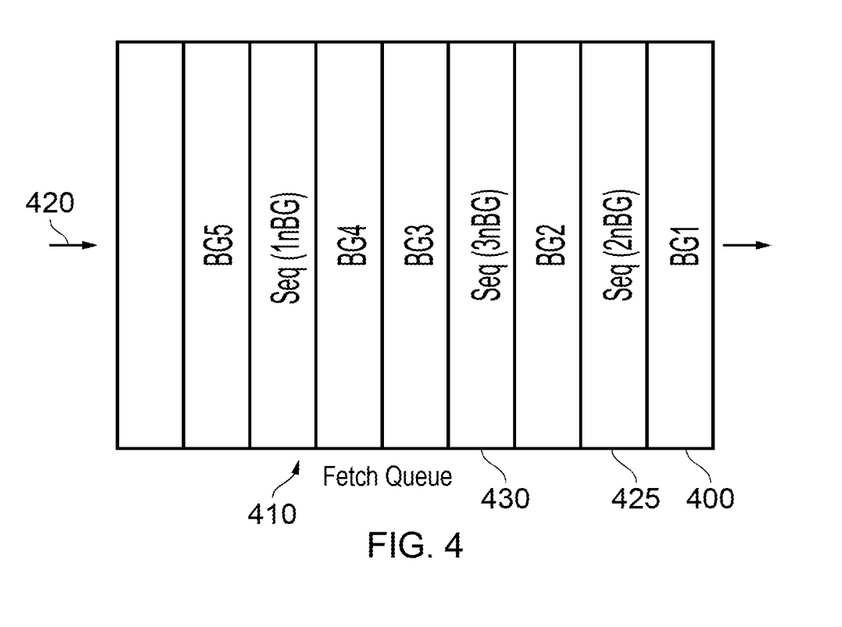
FIGS. 4 to 6 schematically illustrate example contents of a branch target buffer.

FIG. 4 schematically illustrates a fetch queue such as the fetch queue 140 of FIG. 1. Here, a next portion or granule to be fetched is indicated schematically by an entry at the right-hand side 400 of the fetch queue 410, and entries are loaded into the fetch queue 410 by the prediction circuitry 150 at the left-hand side 420 of the fetch queue. As a granule or portion is taken from the right-hand side 400 to be fetched by the fetch logic 120, other entries shuffle right-wards so as to be ready for pulling from the fetch queue by the fetch circuitry 120. In this way, the fetch queue operates in a first-in, first-out mode.

Figure 5:
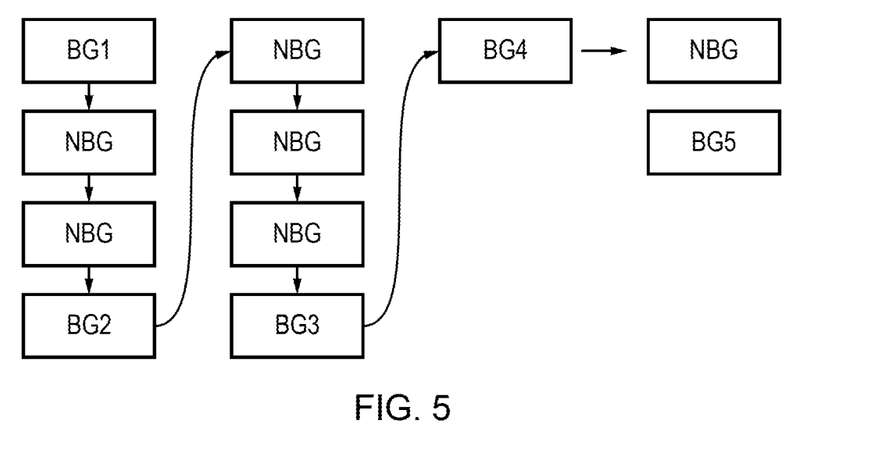

FIG. 5 is a schematic example of a succession of granules represented by the contents of the schematic fetch queue of FIG. 4.

A first granule in the fetch queue 410 is a branching granule (BG) referred to as BG1. The term branching granule indicates that this granule contains at least one branch instruction, with a predicted outcome (in this example) of "branch not taken". The next entry 425 does not, however, indicate the program counter or start address of another granule but rather indicates that there are then two intervening granules in the program flow sequence which do not contain branch instructions (non-branching granules or NBGs), before a next branching granule BG2. The prediction circuitry can therefore know with certainty that after execution of the branching granule and the predicted branch outcome from that granule, the next two granules starting from the predicted outcome can be queued for fetching without any need to look up those entries in the BTB or BPB. After the two non-branching granules the granule BG2 is next in program order. This is predicted to cause a branch of program flow to a succession of three non-branching granules indicated by an entry 430 in the fetch queue which simply indicates that three successive granules need to be fetched without the need for a lookup. In this example the prediction circuitry is configured to add a single entry to the fetch queue indicating two or more intervening blocks.

In order to achieve this operation, in examples of the present disclosure the predictions at the prediction circuitry 150 comprises:

Branch prediction circuitry to predict a branch destination for a branch instruction in a current block (granule, portion), the predicted branch destination representing either a branch target for a branch predicted to be taken or a next instruction after the branch instruction, for a branch predicted not to be taken; and Sequence prediction circuitry to predict sequence data, associated with the predicted branch destination, identifying a next block following the predicted branch destination in the program flow order having a next instance of a branch instruction and to add to the fetch queue the identified next block and any intervening blocks between the current block and the identified next block and to initiate branch prediction in respect of the predicted next instance of a branch instruction.

Example techniques of achieving this functionality will now be described, with reference to FIGS. 6 to 8 which schematically illustrate example contents of a branch target buffer such as the BTB 160.

Figure 6:
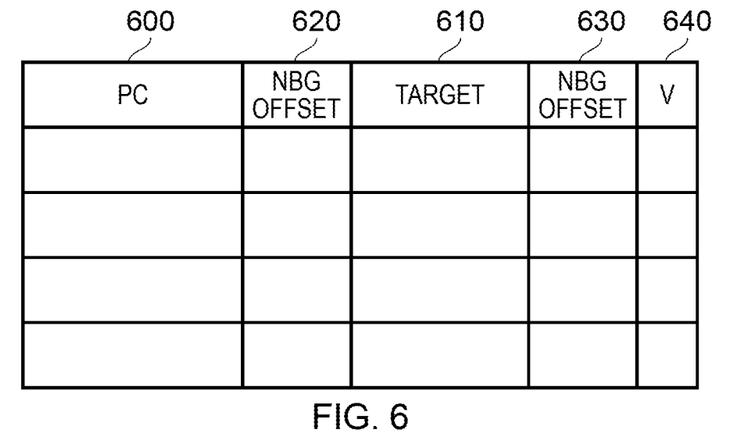

Referring to FIG. 6, an example branch target buffer stores program counter values 600 and, where a branch has previously been detected at that program counter value, a branch target address 610. Associated with the program counter value 600 is an offset value 620. This indicates, in the present examples, a number of next-following blocks in the program code order before a subsequent block containing a branch instruction. The data 620 is on the assumption that branches in the current block are not taken. Similarly, associated with the target address 610 is another offset value 630 which indicates—starting from that target—a number of blocks before a next block having a branch instruction. Optionally, the entries in the branch target buffer may have an associated validity flag 640.

FIG. 6 provides an example in which the prediction circuitry 150 comprises:

branch target storage 160, 170 to store:

one or more entries each comprising a program counter value 600 and a respective branch target address 610 for a previously taken branch instruction; and sequence data identifying (630) the next block having a next instance of a branch instruction for the case that the branch is taken and identifying (620) the next block having a next instance of a branch instruction for the case that the branch is not taken.

In these examples, the sequence data comprises offset data (NBG Offset) 620, 630 indicating the number of blocks in the program flow order between the current block and the identified next block.

The prediction circuitry 150 is configured to predict, for an entry in the branch target storage applicable to a given program counter value, whether the branch represented by that entry will be taken.

Figure 7:
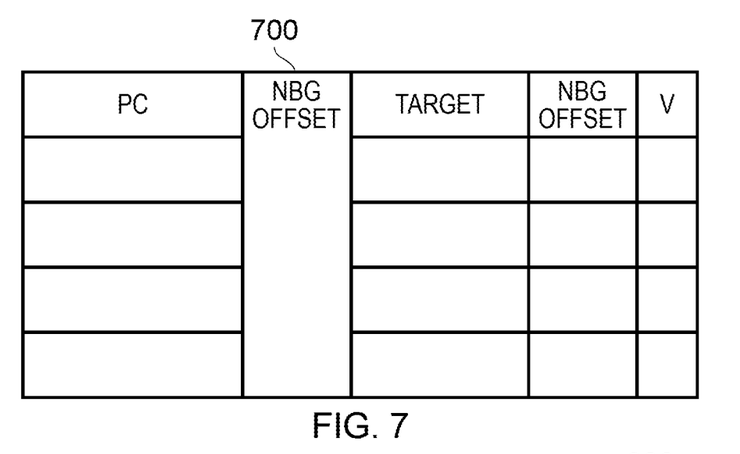
FIG. 7 schematically illustrates a prediction queue.

Referring to FIG. 7, it is noted that a particular block may contain multiple branch instructions, each having an associated target. However, the outcome when none of the branch instructions is taken is the same for the entire set of branch instructions, in that control just passes to the next sequential block (the address C in FIG. 2). So, a single branch-not-taken offset value 700 can be provided instead of individual ones associated with each program counter value for each branch instruction.

FIG. 7 provides an example in which the branch target storage is configured to store a single instance 700 of sequence data for the case that a branch is not taken, common to all entries relating to a given block.

Figure 8:
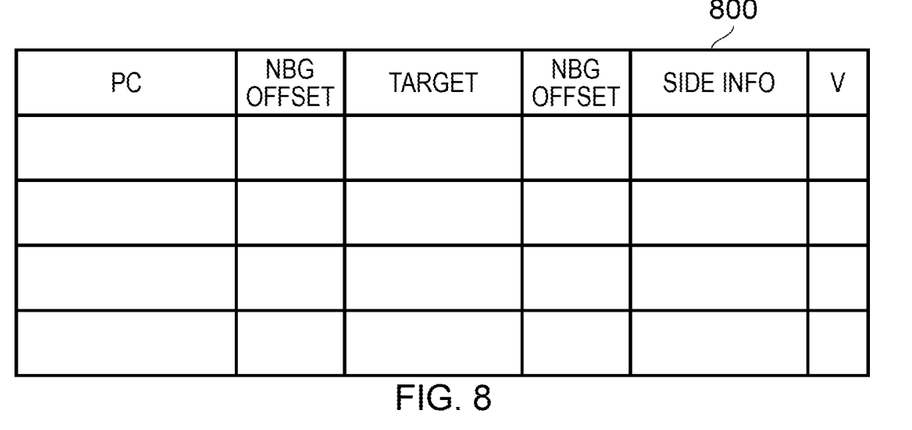
FIG. 8 schematically illustrates a set of program code portions or granules relating to the example of FIG. 7.

FIG. 8 is similar except that further side information 800 or meta data can be associated with the target address, indicating for example a choice of predictor algorithm or circuitry (out of an available choice of two or more) to be used at the next-following branch prediction. In this regard FIG. 8 provides an example in which the branch target storage is configured to store, in association with sequence data indicating a next block, metadata indicating an aspect of the branch prediction applicable to the identified next block.

Figure 11:
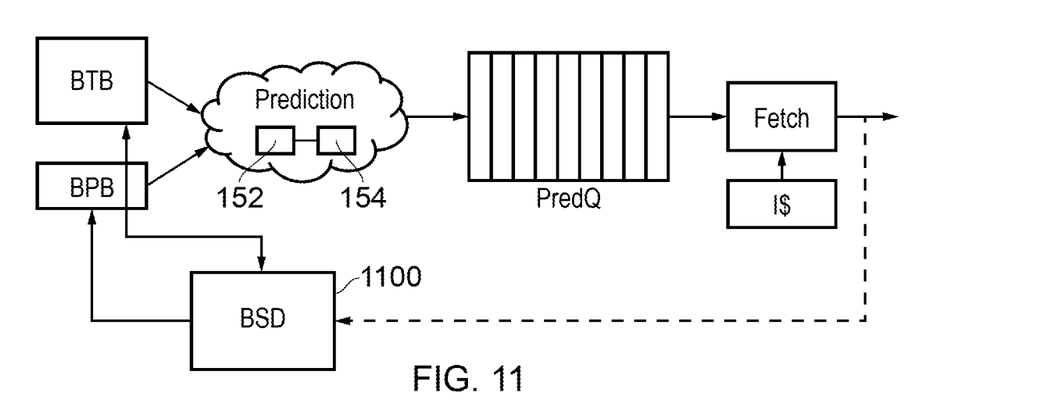
FIG. 11 schematically illustrates another example of the use of an example branch sequence detector.
Figure 12:
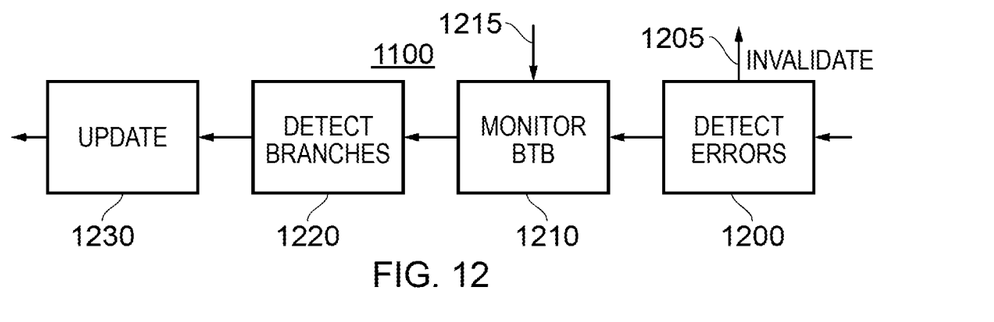
FIG. 12 schematically illustrates the branch sequence detector of FIG. 11 in more detail.

Two example techniques for populating and maintaining the sequence data discussed above will now be described. These can be generalised as an architectural technique (FIGS. 9 and 10) and a speculative technique (FIGS. 11 and 12)

Figure 9:
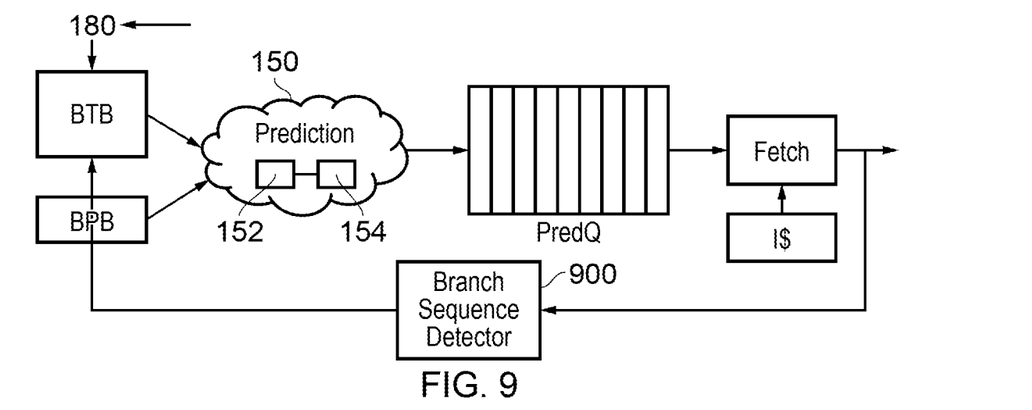
FIG. 9 schematically illustrates the use of an example branch sequence detector.

Referring first to FIG. 9, as mentioned above the prediction circuitry comprises branch prediction circuitry 152 and sequence prediction circuitry 154. The sequence data in the BTB is populated by a branch sequence detector (BSD) 900, shown in more detail in FIG. 10.

The BSD can also be considered as part of the overall function of the prediction circuitry 150. At system start (or after boot) it is configured to initialise the offset (sequence) data stored in the BTB of FIGS. 6 to 8 to indicate a zero offset. This has the effect of setting a default position that prediction will take place for every block or granule, which is a safe starting situation. Subsequently, during population of the sequence data, where successions of NBGs are detected, non-zero offsets can be populated into entries in the BTB.

In operation, the BTB is populated with the PC and target for branches by virtue of the information 180 from the processing element 110. The BSD 900 examines fetched program code (as fetched by the fetch circuitry 120) to detect blocks containing a branch instruction. From this detection, the BSD 900 detects as the offset data the number of blocks in the program flow order (which may of course be based upon the previous branch being taken or not taken) until a next branching block BG, by adding one to an offset value for each such NBG discovered in the fetched code and storing the resulting offset value as either the branch-not-taken offset value 620 associated with the PC 600 or the branch-taken offset value 630 associated with the target address 610, in response to detection of the next BG. Therefore the BSD 900 provides an example of a branch detector to detect the presence of branch instructions in blocks fetched by the fetch circuitry and to generate the sequence data for storage by the branch target storage in dependence upon the detection.

Figure 10:
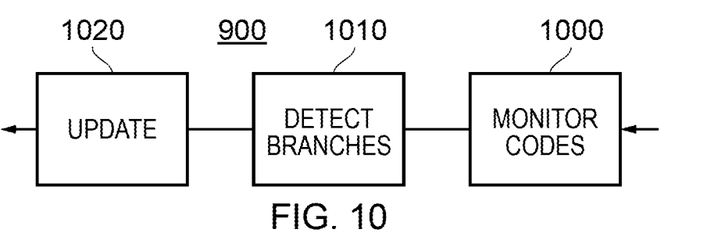
FIG. 10 schematically illustrates the branch sequence detector of FIG. 9 in more detail.

Referring to FIG. 10, the BSD 900 can comprise a code monitor module 1000 to monitor the fetched code, a branch detector 1010 to detect NBGs in the fetched code and an update module 1020 to update the relevant stored sequence data value or values.

FIG. 11 relates to a speculative population of the sequence data, in which the detection of NBGs is based upon entries in the BTB rather than directly upon the actual fetched code as in FIG. 9. Here a BSD 1100 (shown in more detail in FIG. 12) is responsive to a chain of blocks to be fetched as indicated by BTB entries, to detect a next block in that chain which itself has a BTB entry associated with a program counter value falling in that block. The BSD 1100 therefore provides an example of a branch detector to detect the presence of an entry in the branch target storage for a block to be fetched by the fetch circuitry and to generate the sequence data for storage by the branch target storage in dependence upon the detection. To avoid instabilities in the data source for the operation of the BSD 1100, the BSD 1100 can be configured to detect a rate of change of entries in the branch target storage (for example, a rate of change of BTB entries) and to defer generating the sequence data until the detected rate of change is below a threshold rate. the threshold rate can be appropriate to stable established operation rather than an initial period of operation of the circuitry.

The BSD 1100 can also be responsive to a detection (from the fetched code or the processing element 110 for example) of a branch instruction, in a block indicated by the sequence data not to contain a branch instruction, to invalidate at least a part of the sequence data. For example, the BSD 1100 can invalidate all of the stored sequence data, for example by setting the validity flags 640 of FIGS. 6 to 8 to indicate "invalid", or it can invalidate only those items of sequence data relevant to the detected discrepancy. Another way of invalidating the sequence data without the need for a validity flag is simply to reset the relevant values to indicate zero offset.

Referring to FIG. 12, in an example the BSD 1100 comprises an error detector module 1200 to detect discrepancies between the speculatively detected NBG offsets and actual fetched code and to issue an invalidate signal 1205 to the BTB, a monitor module 1210 to monitor entries 1215 in the BTB, a branch detector module 1220 to detect blocks as BGs or NBGs, and an update module 1230 to update the sequence data stored by the BTB.

In the examples above, the sequence data, associated with the predicted branch destination, identifies a first next block following the predicted branch destination in the program flow order having a next instance of a branch instruction. In other examples, the sequence data can also identify at least one further next block having a next instance of a branch instruction following a predicted branch destination for the identified first next block. This can allow more than one entry to be added to the fetch queue at a single operation.

Figure 13:
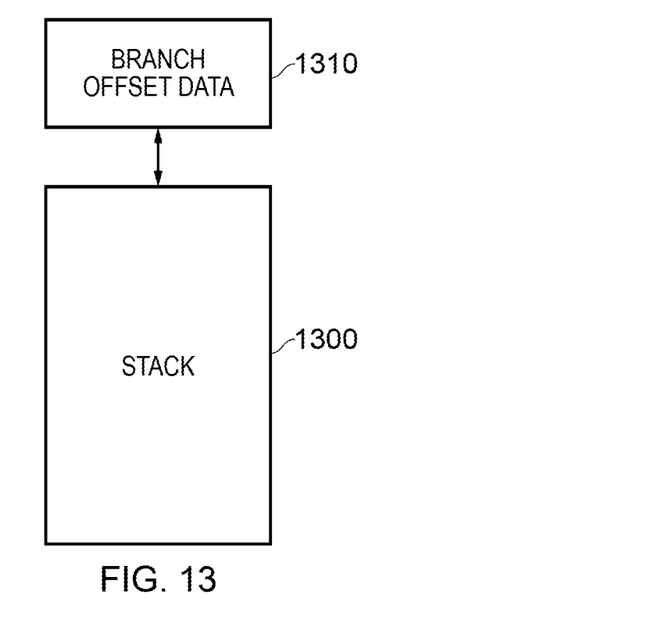
FIG. 13 schematically illustrates a stack.
Figure 14:
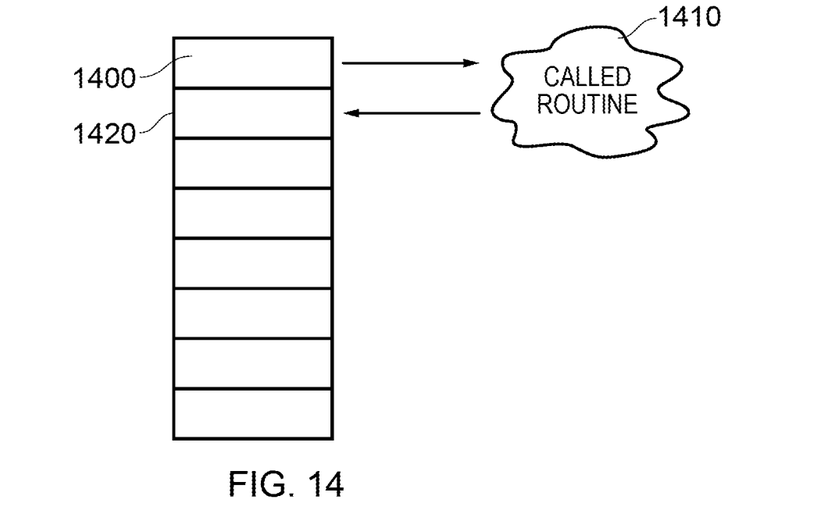
FIG. 14 schematically illustrates a program code call operation.

FIGS. 13 and 14 relate to operation of the above arrangements in the case of a so-called subroutine call instruction.

In a subroutine call, if the call is taken a current processor state is saved, for example by being pushed to storage referred to as a "stack", and program flow is branched to another code location for execution of a subroutine. At the end of the subroutine a return is executed so that the previous processor state is retrieved from the stack and program flow returns to the instruction following the subroutine calling instruction. So, after execution of the subroutine, control is returned to a return address defining an instruction following the call instruction and program state information including the return address is stored in a return stack while the subroutine is executed.

With relevance to the present techniques, this operation can be considered in some ways as equivalent to a branch not taken outcome at the subroutine calling instruction, because eventually (albeit after execution of the subroutine) control is returned to the next-following instruction in program flow order (in fact whether or not the subroutine call is actually taken). If the call is taken, a BTB entry can be established to indicate the next block to be fetched (in order to execute the subroutine). The offset data 630 is relevant to the address of the subroutine code. The offset data 620 is relevant to the continuing operation after return from the subroutine, but since the return is to the next instruction after the subroutine calling instruction, this offset data may not be available at that point. To address this, in example arrangements as shown in FIG. 13, the prediction circuitry is configured to store (to the return stack 1300) sequence data 1310 applicable to a branch not taken. Then, at execution of a subroutine calling instruction 1400 (FIG. 14), a called routine 1410 is executed and control is returned to the next following instruction 1420 at which time the branch not taken offset data is retrieved from the stack 1300 for use in predicting next blocks to be fetched.

Figure 15:
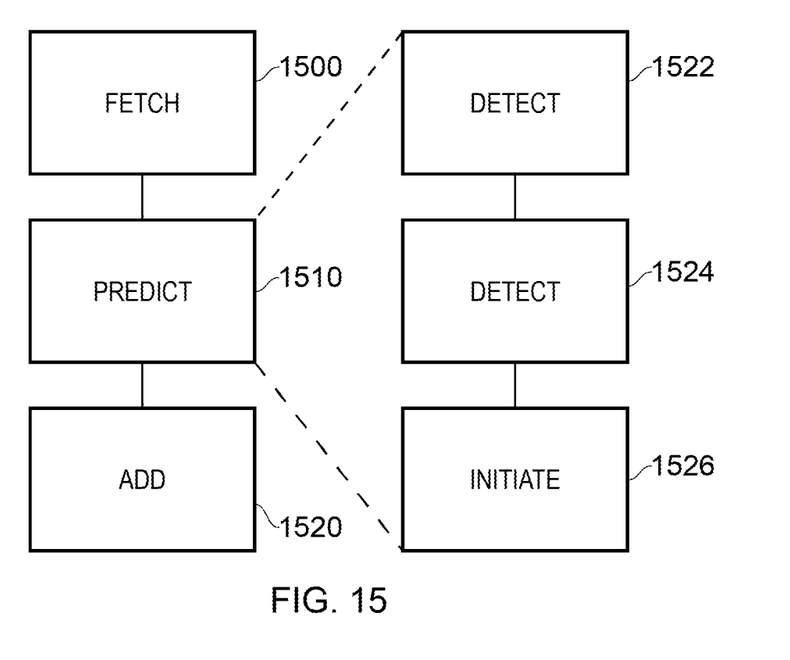
FIG. 15 is a schematic flowchart illustrating a method of data processing.

FIG. 15 is a schematic flowchart illustrating a data processing method comprising:

fetching (at a step 1500) blocks, containing instructions for execution, defined by a fetch queue; and predicting (at a step 1510) one or more next blocks to be fetched; and adding (at a step 1520) the predicted one or more next blocks to the fetch queue;

the predicting step comprising:

detecting (at a step 1522) a predicted branch destination for a branch instruction in a current block, the predicted branch destination representing either a branch target for a branch predicted to be taken or a next instruction after the branch instruction, for a branch predicted not to be taken;

detecting (at a step 1524) sequence data, associated with the predicted branch destination, identifying a next block following the predicted branch destination in the program flow order having a next instance of a branch instruction, so that the predicted one or more next blocks comprise the identified next block and any intervening blocks between the current block and the identified next block; and initiating (at a step 1526) branch prediction in respect of the predicted next instance of a branch instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Data processing circuitry comprising:
    fetch circuitry to fetch blocks, containing instructions for execution, defined by a fetch queue, the blocks having the same length; and
    prediction circuitry to predict one or more next blocks to be fetched and to add the predicted next blocks to the fetch queue;
    the prediction circuitry comprising:
    branch prediction circuitry to detect a predicted branch destination for a branch instruction in a current block, the predicted branch destination representing either a branch target for a branch predicted to be taken or a next instruction after the branch instruction, for a branch predicted not to be taken; and
    sequence prediction circuitry to detect sequence data, associated with the predicted branch destination, identifying a next block following the predicted branch destination in the program flow order having a next instance of a branch instruction, to determine based on the sequence data how many intervening blocks occur between the current block and the identified next block, to add to the fetch queue the identified next block and any intervening blocks between the current block and the identified next block, and to initiate branch prediction in respect of the predicted next instance of a branch instruction.

2. Circuitry according to claim 1, in which the prediction circuitry comprises:
    branch target storage to store:
    one or more entries each comprising a program counter value and a respective branch target address for a previously taken branch instruction; and
    the sequence data identifying the next block having a next instance of a branch instruction for the case that the branch is taken and identifying the next block having a next instance of a branch instruction for the case that the branch is not taken.

3. Circuitry according to claim 2, in which the sequence data comprises offset data indicating the number of blocks in the program flow order between the current block and the identified next block.

4. Circuitry according to claim 2, in which the branch target storage is configured to store a single instance of sequence data for the case that a branch is not taken, common to all entries relating to a given block.

5. Circuitry according to claim 2, in which the branch prediction circuitry is configured to predict, for an entry in the branch target storage applicable to a given program counter value, whether the branch represented by that entry will be taken.

6. Circuitry according to claim 3, comprising a branch detector to detect the presence of branch instructions in blocks fetched by the fetch circuitry and to generate the sequence data for storage by the branch target storage in dependence upon the detection.

7. Circuitry according to claim 2, comprising a branch detector to detect the presence of an entry in the branch target storage for a block to be fetched by the fetch circuitry and to generate the sequence data for storage by the branch target storage in dependence upon the detection.

8. Circuitry according to claim 7, in which the branch detector is configured to detect a rate of change of entries in the branch target storage and to defer generating the sequence data until the detected rate of change is below a threshold rate.

9. Circuitry according to claim 7, in which the prediction circuitry is configured to initialise the offset data to indicate a zero offset.

10. Circuitry according to claim 1, in which the prediction circuitry is configured, in response to a detection of a branch instruction, in a block indicated by the sequence data not to contain a branch instruction, to invalidate at least a part of the sequence data.

11. Circuitry according to claim 10, in which the prediction circuitry is configured, in response to a detection of a branch instruction, in a block indicated by the sequence data not to contain a branch instruction, to invalidate all of the sequence data.

12. Circuitry according to claim 1, in which the blocks each have a base length and are address-aligned in memory to multiples of the base length.

13. Circuitry according to claim 1, in which the branch target storage is configured to store, in association with sequence data indicating a next block, metadata indicating an aspect of the branch prediction applicable to the identified next block.

14. Circuitry according to claim 2, in which the sequence data, associated with the predicted branch destination, identifies a first next block following the predicted branch destination in the program flow order having a next instance of a branch instruction and at least one further next block having a next instance of a branch instruction following a predicted branch destination for the identified first next block.

15. Circuitry according to claim 1, in which, for a subroutine call instruction for which, after execution of the subroutine, control is returned to a return address defining an instruction following the call instruction and program state information including the return address is stored in a return stack while the subroutine is executed, the prediction circuitry is configured to store to the return stack sequence data applicable to a branch not taken.

16. Circuitry according to claim 1, in which the sequence prediction circuitry is configured to add a single entry to the fetch queue indicating two or more intervening blocks.

17. Data processing apparatus comprising:
    means for fetching blocks, containing instructions for execution, defined by a fetch queue, the blocks having the same length; and
    means for predicting one or more next blocks to be fetched; and means for adding the one or more predicted next blocks to the fetch queue;

the means for predicting comprising:

means for detecting a predicted branch destination for a branch instruction in a current block, the predicted branch destination representing either a branch target for a branch predicted to be taken or a next instruction after the branch instruction, for a branch predicted not to be taken;

means for detecting sequence data, associated with the predicted branch destination, identifying a next block following the predicted branch destination in the program flow order having a next instance of a branch instruction, and for determining based on the sequence data how many intervening blocks occur between the current block and the identified next block, so that the predicted one or more next blocks comprise the identified next block and any intervening blocks between the current block and the identified next block;

means for adding to the fetch queue the identified next block and any intervening blocks between the current block and the identified next block, and means for initiating branch prediction in respect of the predicted next instance of a branch instruction.

18. A data processing method comprising:

fetching blocks, containing instructions for execution, defined by a fetch queue, the blocks having the same length; and predicting one or more next blocks to be fetched; and adding the predicted one or more next blocks to the fetch queue;

the predicting step comprising:

detecting a predicted branch destination for a branch instruction in a current block, the predicted branch destination representing either a branch target for a branch predicted to be taken or a next instruction after the branch instruction, for a branch predicted not to be taken;

detecting sequence data, associated with the predicted branch destination, identifying a next block following the predicted branch destination in the program flow order having a next instance of a branch instruction, and determining based on the sequence data how many intervening blocks occur between the current block and the identified next block, so that the predicted one or more next blocks comprise the identified next block and any intervening blocks between the current block and the identified next block, and initiating branch prediction in respect of the predicted next instance of a branch instruction.

* * * * *